United States Patent [19]

Yamamoto et al.

[11] Patent Number: 4,791,503

[45] Date of Patent: Dec. 13, 1988

[54] MAGNETIC TAPE CARTRIDGE MADE FROM HEAT RESISTANT RESINOUS MATERIAL

[75] Inventors: Yoshinori Yamamoto; Muneyoshi Ochi, both of Takatsuki, Japan

[73] Assignee: Hitachi Maxell, Ltd., Osaka, Japan

[21] Appl. No.: 946,026

[22] Filed: Dec. 24, 1986

[30] Foreign Application Priority Data

Dec. 26, 1985 [JP] Japan .................................. 60-293699

[51] Int. Cl.[4] ............................................ G11B 23/087
[52] U.S. Cl. .................................................. 360/132
[58] Field of Search .......................... 360/132; 242/198

[56] References Cited

U.S. PATENT DOCUMENTS 4,674,703  6/1987  Falk ....................................... 360/132
4,688,128  8/1987  Shiba et al. .......................... 360/132

FOREIGN PATENT DOCUMENTS 59-117768  7/1984  Japan ..................................... 360/132

*Primary Examiner*—Robert S. Tupper
*Attorney, Agent, or Firm*—Birch, Stewart, Kolasch & Birch

[57] ABSTRACT

A magnetic tape cartridge comprising a main case made of a resinous material selected from a copolymer comprising repeating units derived from a nitrogen-containing heterocyclic compound and a blend containing a homo- or co-polymer comprising repeating units derived from a nitrogen-containing heterocyclic compound, which has good heat resistance and suffers from less deformation at a high temperature. The content of the nitrogen-containing compound in the copolymer or blend is from 5 to 30% by weight.

5 Claims, 3 Drawing Sheets

MAGNETIC TAPE CARTRIDGE MADE FROM HEAT RESISTANT RESINOUS MATERIAL

BACKGROUND OF THE INVENTION

1. Field of the Invention

The present invention relates to a magnetic tape cartridge. More particularly, it relates to a magnetic tape cartridge having good heat resistance.

2. Description of the Prior Art

A magnetic tape cartridge comprises a pair of hubs rotationally placed in a main case and a magnetic tape is wound around the hubs. The main case is usually molded from a styrene base resin, such as polystyrene and an acrylonitrile/butadiene/styrene (ABS) resin.

Recently, the magnetic tape cartridge is often used under very severe conditions, such as in an automobile during the summer season. However, the cartridge made of the styrene base resin does not have satisfactory heat resistance and tends to deform under such high temperature condition.

SUMMARY OF THE INVENTION

One object of the present invention is to provide a magnetic tape cartridge with good heat resistance.

Another object of the present invention is to provide a magnetic tape cartridge which does not suffer from substantial deformation at high temperature.

These and other objects are accomplished by a magnetic tape cartridge of the invention which comprises a main case made of a resinous material selected from a copolymer comprising repeating units derived from a nitrogen-containing heterocyclic compound and a blend containing a homo- or co-polymer comprising repeating units derived from a nitrogen-containing heterocyclic compound.

DETAILED DESCRIPTION OF THE DRAWINGS

The present invention will be illustrated by way of example with reference to the accompanying drawings.

Figure 1:
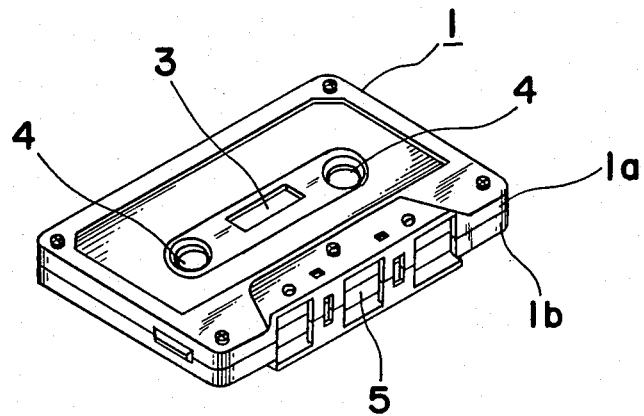
FIG. 1 is a perspective view of one embodiment of an audio magnetic tape cartridge.
Figure 2:
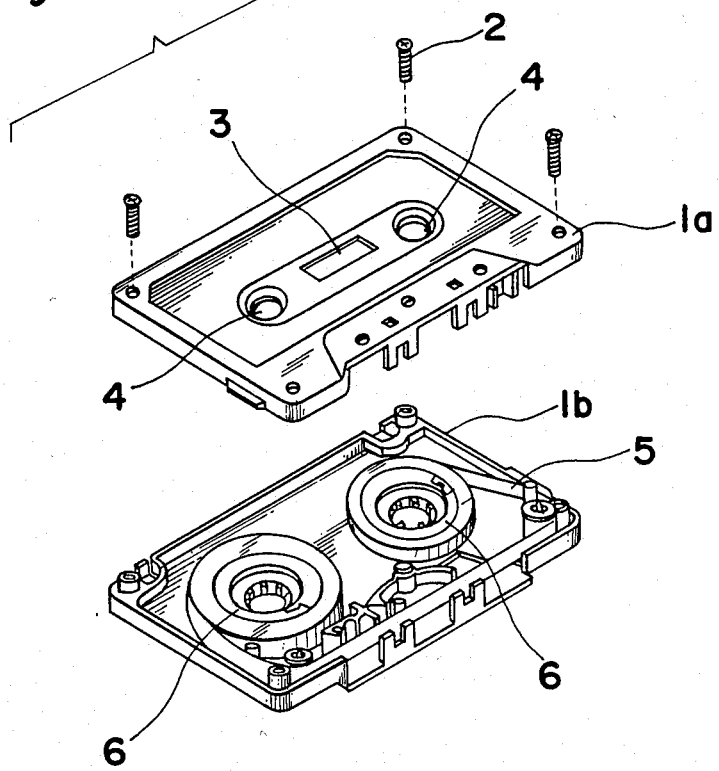
FIG. 2 is an exploded perspective view of the magnetic tape cartridge of FIG. 1.

FIGS. 1 and 2 are a perspective view and an exploded perspective view of a typical magnetic tape cartridge for audio use, respectively. The magnetic tape cartridge of these drawings comprises a main case 1 consisting of an upper half 1a and a lower half 1b, which are integrated or joined by means of screws 2 in a mated state. The main case 1 has a transparent window 3 in its central part, and bores 4 on both sides of the window for inserting drive shafts therethrough. On the bores 4, a pair of hubs 6 are provided, around which a recording tape 5 is wound.

The upper and lower halves 1a and 1b of the main case 1 are made of a resin comprising repeating units derived from a nitrogen-containing heterocyclic compound. Such a resin has excellent heat resistance since the presence of the heterocyclic rings in the backbone chain increases the rigidity of the polymer chain. Therefore, the main case of the tape cartridge of the present invention has improved heat resistance.

Specific examples of the nitrogen-containing heterocyclic compound are maleinimide, N-phenylmaleinimide, N-methylmaleinimide and the like.

In the present invention, not only a copolymer of the nitrogen-containing heterocyclic compound with other comonomer such as styrene, acrylonitrile and butadiene is used, but also a blend of a homo- or co-polymer of the heterocyclic compound with polystyrene, ABS resin, acrylonitrile-styrene resin, SBR resin, poly$\alpha$-methylstyrene, acrylonitrile-chlorinated polyethylene-styrene resin can be used. In the copolymer or the blend, a content of the nitrogen-containing heterocyclic compound is from 5 to 30% by weight. When the content of the heterocyclic compound is less than 5% by weight, the heat resistance of the resin is not sufficiently improved. The copolymer or the blend containing greater than 30% by weight of the heterocyclic compound is less preferable, since the molded article is not easily deformed, and flowability of the resin decreases so that moldability of the resin is deteriorated.

The main case half is produced by a per se conventional molding method, such as injection molding.

Figure 3:
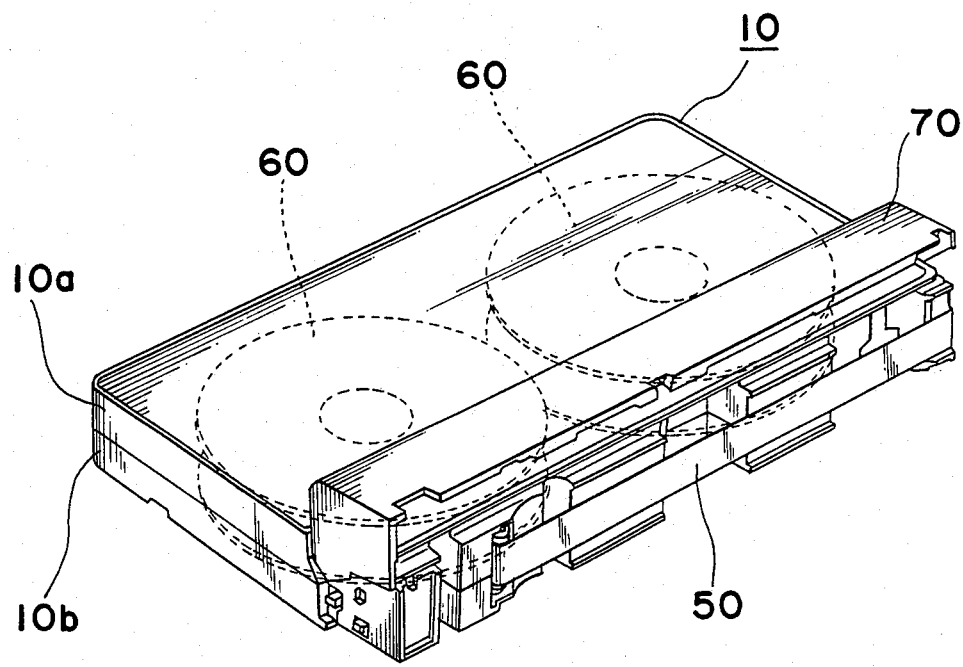
FIG. 3 is a perspective view of one embodiment of a video magnetic tape cartridge.
Figure 4:
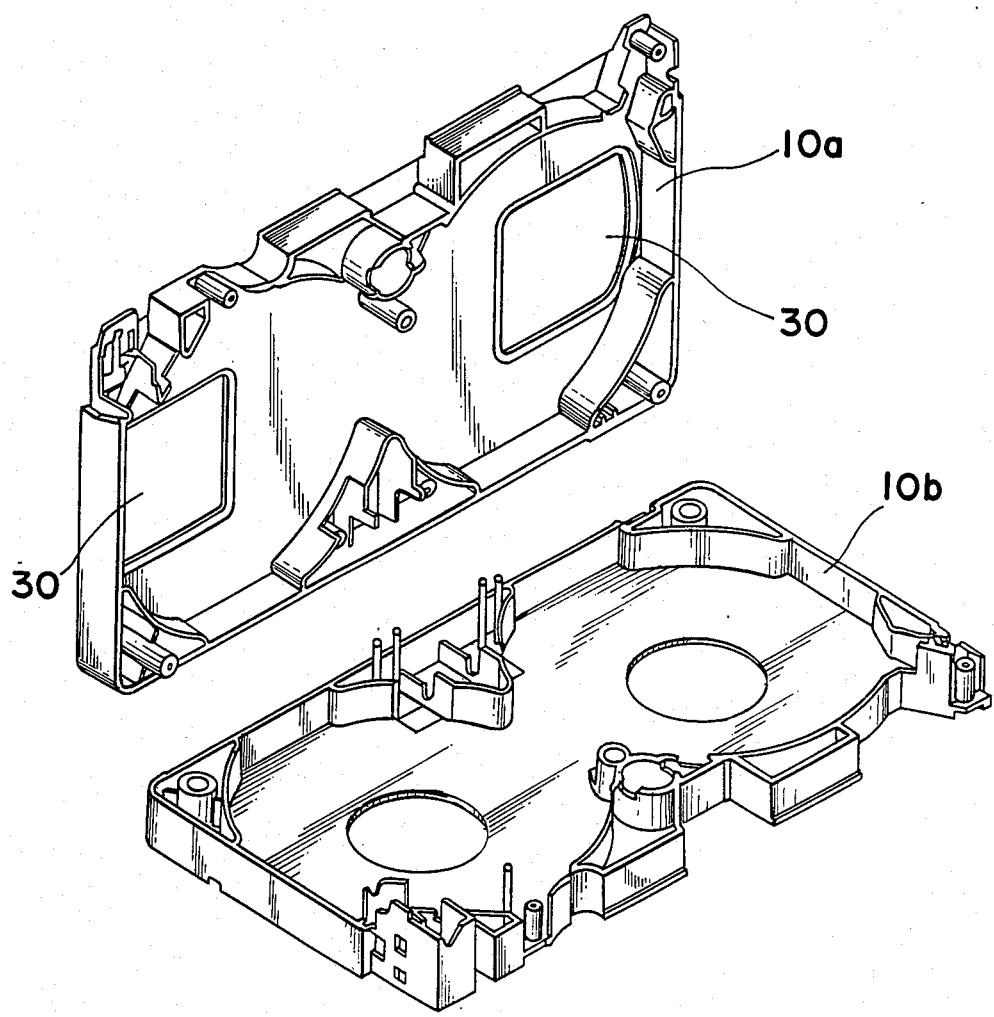
FIG. 4 is an exploded perspective view of the magnetic tape cartridge of FIG. 3.

FIGS. 3 and 4 show a perspective view and an exploded perspective view of a magnetic tape cartridge for video use. A main case 10 consists of an upper half 10a and a lower half 10b, which are integrated or joined by means of screws (not shown) in a capped form. In the main case 10, a pair of tape reels 60 are provided around which a video tape 50 is wound. The upper half 10a of the main case has two windows 30 for viewing a wound amount of the video tape on its right and left parts. A front cover 70 is pivotably attached to the main case 10 to enable an opening and closing motion. According to the present invention, the main case is molded from the resin comprising repeating units derived from the nitrogen-containing heterocyclic compound and thus have excellent heat resistance.

PREFERRED EMBODIMENTS

The present invention will hereinafter be explained further in detail by following examples, in which parts and percentages are by weight unless otherwise indicated.

EXAMPLE 1

A copolymer consisting of of 90 part of styrene and 10 parts of N-phenylmaleimide was kneaded in and extruded from a twin screw extruder to form pellets of the resin. The pellets were injection molded at 230° C. under injection pressure of 800 kg/cm$^2$ to form main case halves 10a and 10b as shown in FIGS. 3 and 4, from which a main case of a magnetic tape cartridge for VTR was produced.

EXAMPLE 2

In the same manner as in Example 1 but using a copolymer of 90 parts of acrylonitrile/butadiene/styrene (weight ratio of 2:1:7) and 10 parts of N-phenylmaleimide in place of the styrene/N-phenylmaleimide copolymer, a main case of a magnetic tape cartridge was produced.

EXAMPLE 3

In the same manner as in Example 1 but using a blend of 90 parts of polystyrene and 10 parts of N-phenylmaleimide resin in place of the styrene/N-phenylmaleimide copolymer, a main case of a magnetic tape cartridge was produced.

EXAMPLE 4

In the same manner as in Example 1 but using a blend of 90 parts of acrylonitrile/butadiene/styrene and 10 parts of N-phenylmaleimide in place of the styrene/N-phenylmaleimide copolymer, a main case of a magnetic tape cartridge was produced.

COMPARATIVE EXAMPLE 1

In the same manner as in Example 1 but using polystyrene in place of the styrene/N-phenylmaleimide copolymer, a main case of a magnetic tape cartridge was produced.

COMPARATIVE EXAMPLE 2

In the same manner as in Example 1 but using acrylonitrile/butadiene/styrene resin in place of the styrene/N-phenylmaleimide copolymer, a main case of a magnetic tape cartridge was produced.

The magnetic tape cartridges produced in Examples and Comparative Examples were kept standing at 130° C. and visually observed and determined a time when deformation of the magnetic tape cartridges started to evaluate their heat resistance. The results are shown in following table.

TABLE

| Example No. | Deformation start time |
|---|---|
| 1 | No deformation after 50 hrs. |
| 2 | No deformation after 50 hrs. |
| 3 | No deformation after 50 hrs. |
| 4 | No deformation after 50 hrs. |
| Comp. 1 | Severely deformed after 10 hrs. |
| Comp. 2 | Severely deformed after 10 hrs. |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic tape cartridge which comprises a main case made of a resinous material selected from a copolymer comprising repeating units derived from a nitrogen-containing heterocyclic compound and a blend containing a homo- or co-polymer comprising repeating units derived from a nitrogen-containing heterocyclic compound wherein content of the nitrogen-containing compound in the copolymer or blend is from 5 to 30% by weight.

2. The magnetic tape cartridge according to claim 1, wherein said resinous material is a copolymer of said nitrogen-containing heterocyclic compound with styrene.

3. The magnetic tape cartridge according to claim 1, wherein said resinous material is a copolymer of said nitrogen-containing heterocyclic compound with acrylonitrile, butadiene and styrene.

4. The magnetic tape cartridge according to claim 1, wherein said resinous material is a blend of a homopolymer of said nitrogen-containing heterocyclic compound with polystyrene or acrylonitrile/butadiene/styrene resin.

5. The magnetic tape cartridge according to claim 1, wherein said resinous material is a blend of a copolymer of said nitrogen-containing heterocyclic compound with polystyrene or acrylonitrie/butadiene/styrene resin.

* * * * *